(12) United States Patent
Murakami et al.

(10) Patent No.: US 10,327,290 B2
(45) Date of Patent: Jun. 18, 2019

(54) LIGHTING CIRCUIT AND VEHICLE LAMP

(71) Applicant: KOITO MANUFACTURING CO., LTD., Tokyo (JP)

(72) Inventors: Takuya Murakami, Shizuoka (JP); Shunichiro Yoshida, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/135,666

(22) Filed: Sep. 19, 2018

(65) Prior Publication Data

US 2019/0098710 A1    Mar. 28, 2019

(30) Foreign Application Priority Data

Sep. 22, 2017   (JP) ................................ 2017-182400

(51) Int. Cl.
*H05B 33/08* (2006.01)
*B60Q 1/00* (2006.01)

(52) U.S. Cl.
CPC ....... *H05B 33/0809* (2013.01); *B60Q 1/0094* (2013.01); *H05B 33/0842* (2013.01)

(58) Field of Classification Search
CPC .... H05B 37/02; H05B 33/08; H05B 33/0809; H05B 33/0842; H05B 33/0845; B60Q 1/0094
See application file for complete search history.

(56) References Cited

U.S. PATENT DOCUMENTS

2011/0018441 A1*   1/2011   Tanaka ................. B60Q 1/0094
                                                                    315/82

FOREIGN PATENT DOCUMENTS

EP         2675247 A1    12/2013
JP      2014-17463 A      1/2014

* cited by examiner

*Primary Examiner* — Jimmy T Vu
(74) *Attorney, Agent, or Firm* — Osha Liang LLP

(57) ABSTRACT

There is provided a lighting circuit configured to drive a light source including a plurality of light emitting units connected in series. The lighting circuit includes a converter which is configured to supply a drive current to the light source, a plurality of high-side switches, each of which is provided between one end of a corresponding light emitting unit and one output of the converter, and a plurality of low-side switches, each of which is provided between another end of the corresponding light emitting unit and another output of the converter.

5 Claims, 6 Drawing Sheets

LIGHTING CIRCUIT AND VEHICLE LAMP

CROSS-REFERENCE TO RELATED APPLICATIONS

The present application claims the benefit of priority of Japanese Patent Application No. 2017-182400, filed on Sep. 22, 2017, the content of which is incorporated herein by reference.

TECHNICAL FIELD

Aspects of the present invention relate to a lighting device used in an automobile or the like.

BACKGROUND

A vehicle lamp includes a plurality of lamps for a high beam and a low beam. In recent years, there lamps adopt semiconductor light sources such as a Light Emitting Diode (LED) and a Laser Diode (LD). FIG. 1 is a circuit diagram of a vehicle lamp using a semiconductor light source.

A vehicle lamp 1r includes a light source 10 and a lighting circuit 20r thereof. The lighting circuit 20r includes a current source 30, a plurality of bypass switches 40_1 to 40_N, and a controller 50. The current source 30 receives a battery voltage $V_{BAT}$ (also referred to as an input voltage $V_{IN}$) from a battery 2 via a switch 4 and stabilizes a drive current $I_{DRV}$ flowing through the light source 10 to a certain target amount.

The plurality of bypass switches 40_1 to 40_N are associated with a plurality of light emitting units 12_1 to 12_N, and ON/OFF of each bypass switch 40 can be controlled individually. When the i-th bypass switch 40_i is in an ON state, the drive current $I_{DRV}$ flows to the bypass switch 40_i instead of the light emitting unit 12_i, so that the light emitting unit 12_i is turned off. When the bypass switch 40_i is in an OFF state, the drive current $I_{DRV}$ flows to the light emitting unit 12_i, so that the light emitting unit 12_i is turned on. JP-A-2014-017463 discloses an example of a lighting circuit.

The inventors of the present invention has analyzed the vehicle lamp 1r of FIG. 1 and found the followings.

The light source 10 and the lighting circuit 20r are connected via wiring (harnesses). When a failure (for example, a ground fault) occurs at a point of the wiring, some or all of the light emitting units cannot be turned on. As an example, when an OUT1 pin is shorted to ground, all the light emitting units 12_1 to 12_N cannot be turned on, and when an OUT2 pin is shorted to ground, the light emitting units 12_2 to 12_N in the downstream cannot be turned on.

The present invention has been made in view of the above circumstances, and an exemplary object of the present invention is to provide a lighting circuit capable of reducing functional losses in a failure or an abnormal state.

According to an aspect of the present invention, there is provided a lighting circuit configured to drive a light source including a plurality of light emitting units connected in series. The lighting circuit includes a converter which is configured to supply a drive current to a light source, a plurality of high-side switches, and a plurality of low-side switches. Each high-side switch is provided between one end of a corresponding light emitting unit and one output of the converter. Each low-side switch is provided between another end of the corresponding light emitting unit and another output of the converter.

According to this aspect, the ON/OFF state of the plurality of light emitting units can be controlled by controlling states of the high-side switches and the low-side switches. Further, at the time of a failure, a failure part can be separated, and the lighting of the remaining light emitting units can be maintained. In the present specification, the failure may include a temporary abnormality.

The another output of the converter may be grounded and each low-side switch may be provided between the another end of the corresponding light emitting unit and the ground.

The lighting circuit may further include a diode provided between respective adjacent light emitting units. Accordingly, reverse flow of current can be prevented.

The lighting circuit may further include a plurality of monitoring circuits, each of which is configured to monitor an electrical state of one end of a corresponding light emitting unit. Accordingly, the failure can be detected.

Each monitoring circuit may monitor a voltage at one end of the corresponding light emitting unit. Accordingly, a short-circuit failure such as a ground fault or a power failure or an open circuit (disconnection) can be detected.

According to another aspect of the present invention, there is provided a vehicle lamp. The vehicle lamp may include the light source including the plurality of light emitting units connected in series and the above-described lighting circuit which is configured to drive the light source.

Incidentally, any combination of the above configuration elements, and the configuration elements and expressions of the present invention may be implemented as methods, devices, systems, or the like which are also effective as aspects of the present invention.

According to the above configuration, functional losses at the time of failure can be reduced.

DETAILED DESCRIPTION

Figure 1:
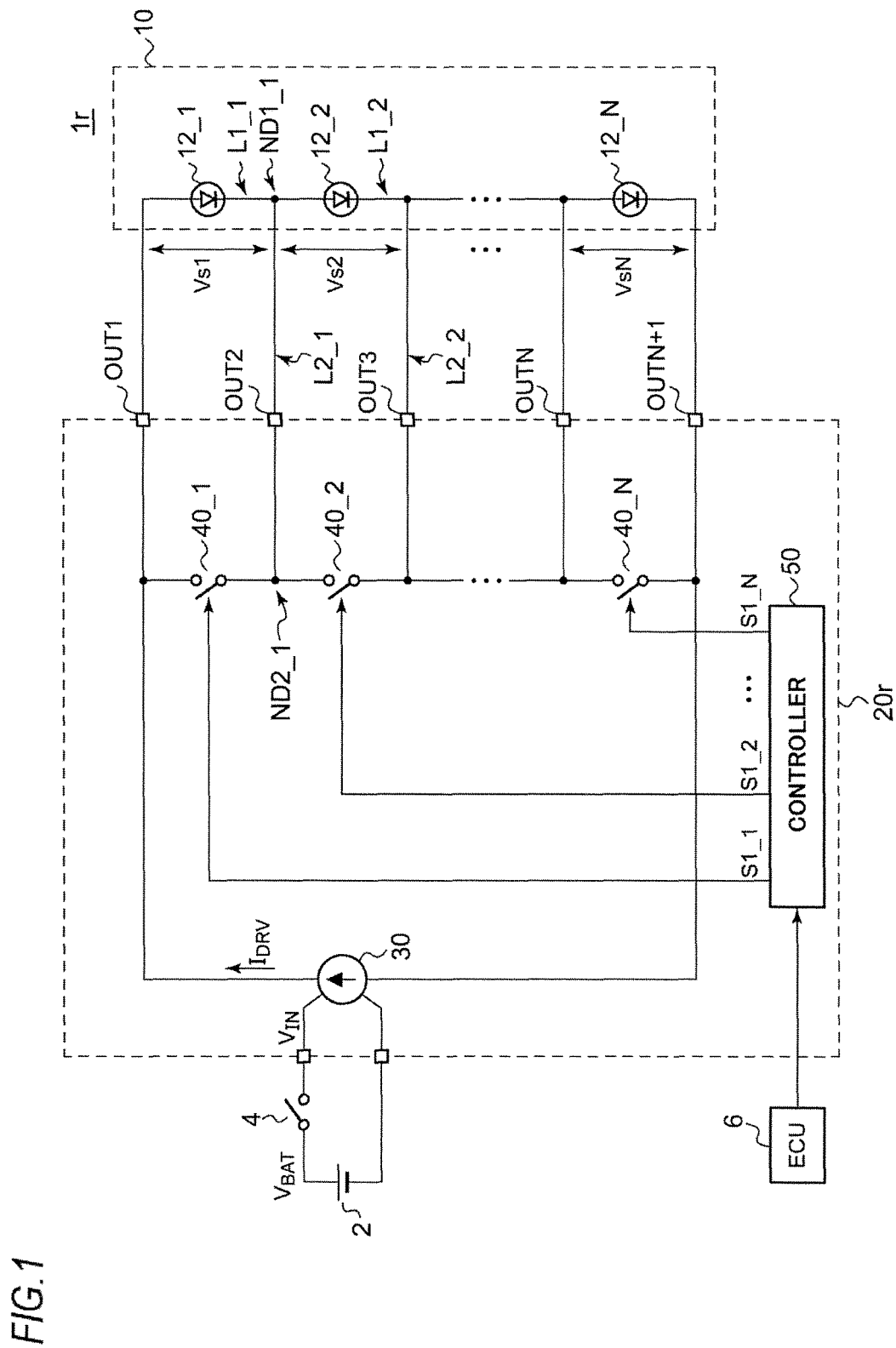
FIG. 1 is a circuit diagram of a vehicle lamp using a semiconductor light source.

Hereinafter, embodiments of the present invention will be described with reference to the drawings. Identical or equivalent configuration elements, members, and processes shown in each drawing are given same reference numerals, and repeated descriptions are omitted appropriately. Further, the embodiments are not intended to limit the invention, and all features and combinations thereof described in the embodiments are not necessarily essential to the invention.

In the present specification, "a state where a member A is connected to a member B" includes not only a case where the member A and the member B are physically and directly connected but also a case where the member A and the member B are indirectly connected via other members which do not substantially affect an electrical connection state thereof or do not impair any function or effect exerted by the connection thereof.

Similarly, "a state where a member C is provided between the member A and the member B" includes not only a case where the member A and the member C or the member B and the member C are directly connected but also a case where the member A and the member C, or the member B and the member C are connected indirectly via other members which do not substantially affect an electrical connection state thereof or do not impair any function or effect exerted by the connection thereof.

In the specification, reference numerals given to electrical signals such as voltage signals and current signals, or circuit elements such as resistors and capacitors represent voltage values and current values, or resistance values and capacitance values respectively as necessary.

Figure 2:
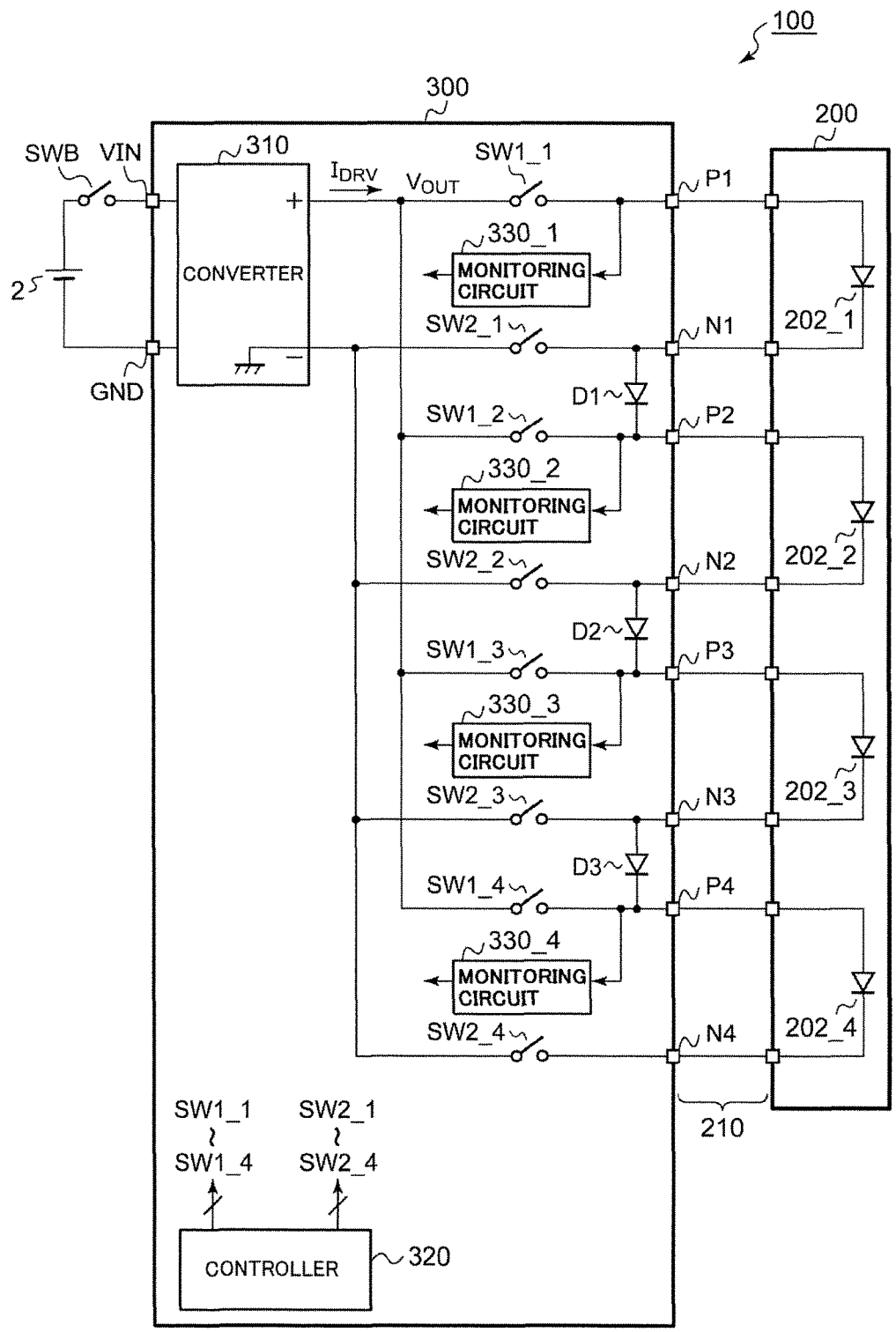
FIG. 2 is a block diagram of a lighting device including a lighting circuit according to an embodiment.

FIG. 2 is a block diagram of a lighting device 100 including a lighting circuit 300 according to the embodiment. The lighting device 100 includes a light source 200 and the lighting circuit 300. The light source 200 includes a plurality of light emitting units 202_1 to 202_N connected in series. The number N of the light emitting units 202 is not particularly limited. N=4 in the present embodiment. Examples of the light emitting units 202 include a Light Emitting Diode (LED), a Laser Diode (LD), and an organic EL element and are not limited thereto. Each light emitting unit 202 may include a plurality of light emitting elements connected in series and/or in parallel.

The light source 200 and the lighting circuit 300 are connected via harnesses 210. The lighting circuit 300 receives a power supply voltage (i.e., a battery voltage) $V_{BAT}$ from the battery 2 via a lighting switch SWB and drives the light source 200. The lighting circuit 300 includes a converter 310, a plurality of high-side switches SW1_1 to SW1_N, a plurality of low-side switches SW2_1 to SW2_N, a controller 320, and a plurality of monitoring circuits 330_1 to 330_N.

The converter 310 supplies a drive current $I_{DRV}$ to the light source 200. The type of the converter 310 is not particularly limited, and a known switching converter such as a buck converter, a boost converter, a buck-boost converter, a Cuk converter, a forward converter, or a flyback converter may be used. The type of the converter 310 may be determined according to a forward voltage Vf of the light emitting unit 202 and the number N thereof. Specifically, when $Vf \times N < V_{BAT}$, a buck type can be adopted as the converter 310, and when $Vf \times N > V_{BAT}$, a boost type or a combination of the boost type at a front stage and a buck type at a rear stage may be adopted.

In the present embodiment, the number of the high-side switches SW1 and the number of low-side switches SW2 is four which is equal to the number N of the light emitting units 202.

The i-th (1≤i≤N) high-side switch SW1_i is provided between one end (i.e., an anode) of a corresponding light emitting unit 202_i and one output (i.e., a positive electrode) of the converter 310. The i-th low-side switch SW2_i is provided between another end (i.e., a cathode) of the corresponding light emitting unit 202_i and another output (i.e., a negative electrode) of the converter 310. In the present embodiment, the negative electrode of the converter 310 is grounded, and a positive voltage $V_{OUT}$ is generated at the positive electrode of the converter 310. Therefore, the low-side switch SW2_i is provided equivalently to being provided between the other end (i.e., the cathode) of the corresponding light emitting unit 202_i and the ground.

A plurality of diodes (i.e., rectifier elements) D1 to D3 are provided between respective adjacent light emitting units 202.

The monitoring circuits 330_1 to 330_N monitor an electrical state of one end (the anode in the present embodiment) of the corresponding light emitting unit 202 and determine whether a short circuit failure or an open circuit failure has occurred. For example, the monitoring circuit 330 includes a voltage comparator and may detect respective failures by comparing a voltage to be monitored with a threshold for detecting a short circuit and a threshold for detecting an open circuit. For a specific method of failure detection and a circuit configuration therefore, a monitoring circuit similar to the monitoring circuit used in a bypass method shown in FIG. 1 may be used.

The controller 320 controls the plurality of switches SW1 and SW2. For example, the controller 320 may be a microcomputer or a Central Processing Unit (CPU).

A basic configuration of the lighting circuit 300 has been described above. Next, the operation thereof will be described. A state of the switches described below can be controlled by the controller 320 and cooperative operation with other circuits.

(Normal State)

The lighting circuit 300 can turn on any of the light emitting units 202 which are sequentially connected and turn off the remaining light emitting units 202.

For example, when all the light emitting units 202 are to be turned on, the high-side switch SW1_1 on the highest potential side is turned on, the low-side switch SW2_4 on the lowest potential side is turned on, and the remaining switches are turned off.

It is generalized that when the i-th light emitting unit 202_i to the j-th light emitting unit 202_j (1≤i≤j≤N) are intended to be turned on, the high-side switch SW1_i and the low-side switch SW2_j are turned on.

Figure 3A:
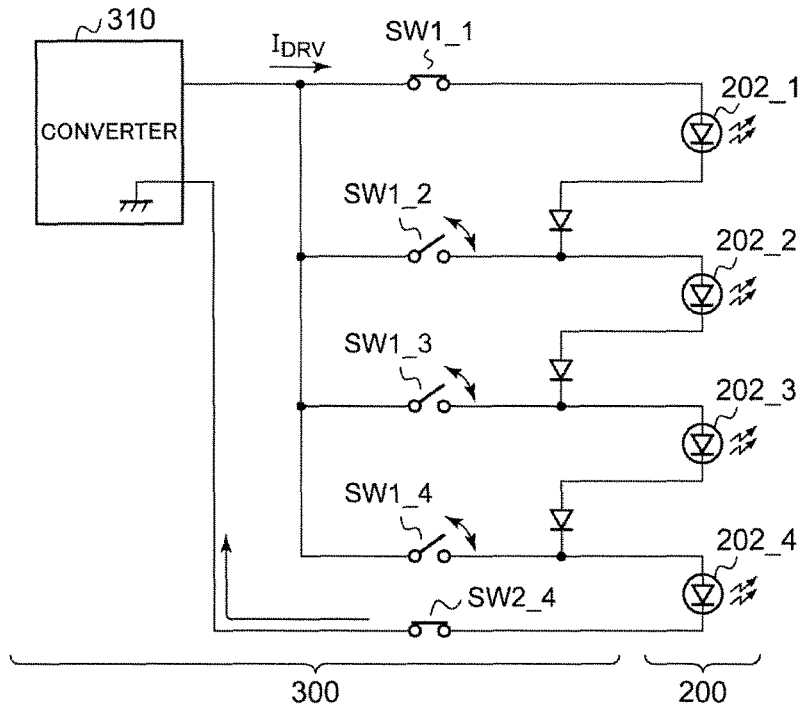
FIGS. 3A and 3B are equivalent circuit diagrams of the lighting circuit in a normal state.
Figure 3B:
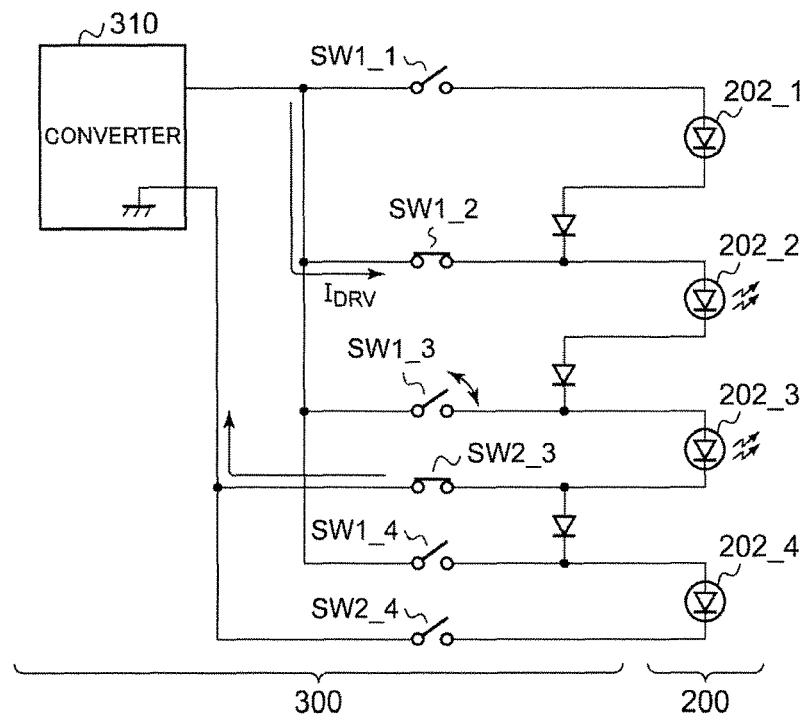

While taking this state as a base, some of the light emitting units 202_i to 202_j can be individually turned off or dimmed. FIGS. 3A and 3B are equivalent circuit diagrams of the lighting circuit 300 in a normal state. In FIGS. 3A and 3B, switches which do not contribute to the operation are omitted.

In FIG. 3A, i=1, j=4, that is, SW1_1 and SW2_4 are fixed in ON states. Accordingly, all the light emitting units 202_1 to 202_4 can be turned on.

The high-side switch SW1_2 also functions as a bypass switch for the light emitting unit 202_1. The high-side switch SW1_3 functions as a bypass switch for the light emitting units 202_1 and 202_2. The high-side switch SW1_4 functions as a bypass switch for the light emitting units 202_1 to 202_3. It is generalized that the k-th high-side switch SW1_k functions as a bypass switch for the light emitting units 202_1 to 202_(k−1).

In FIG. 3A, when the light emitting unit 202_1 is to be turned off temporarily, the high-side switch SW1_2 are turned on. When the light emitting unit 202_1 is to be dimmed, the high-side switch SW1_2 is switched with a duty ratio corresponding to a target brightness.

In FIG. 3B, i=2, j=3, that is, SW1_2 and SW2_3 are fixed in ON states. Accordingly, the two light emitting units 202_2 and 202_3 can be turned on.

In FIG. 3B, when the light emitting unit 202_2 is to be turned off temporarily, the high-side switch SW1_3 is turned on. When the light emitting unit 202_2 is to be dimmed, the high-side switch SW1_3 is switched at a duty ratio corresponding to a target brightness.

FIGS. 3A and 3B are merely examples, and any combination of i and j can be selected.

(Failure State)

Figure 4A:
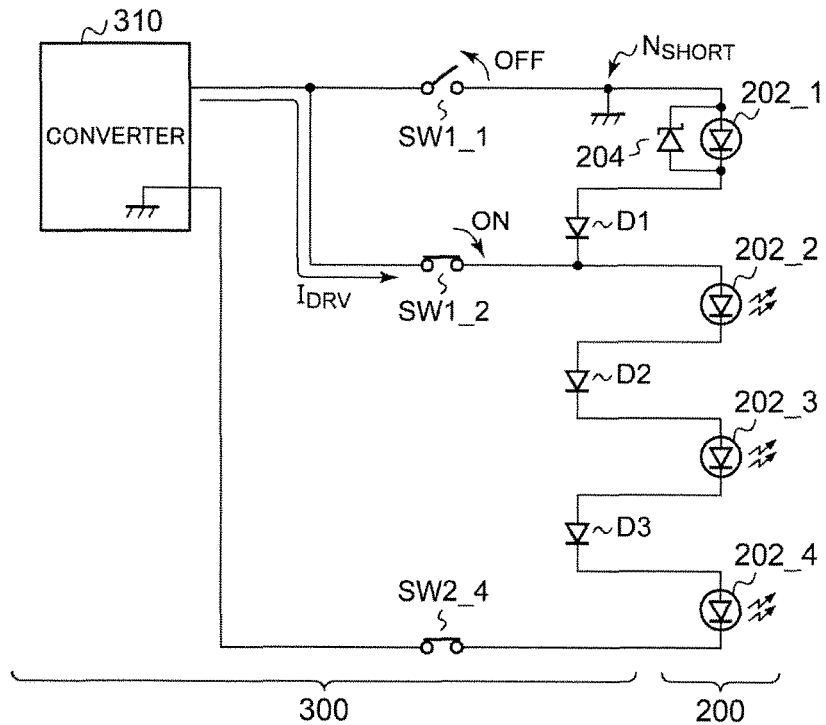
FIGS. 4A and 4B are equivalent circuit diagrams of the lighting circuit in a failure state.
Figure 4B:
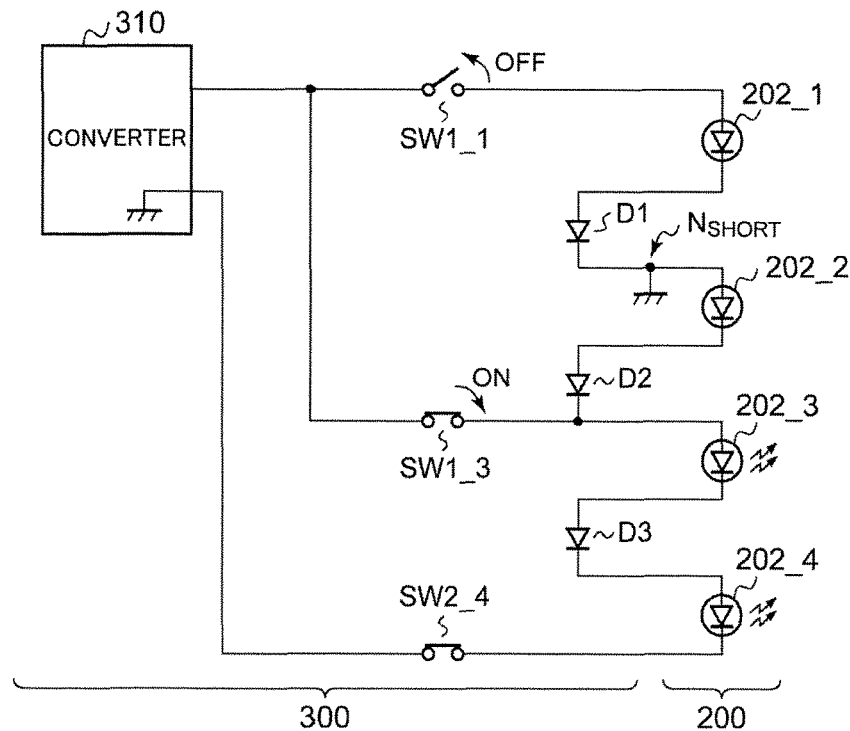

FIGS. 4A and 4B are equivalent circuit diagrams of the lighting circuit 300 in a failure state.

FIG. 4A shows a situation where a short circuit such as a ground fault or a power failure occurs at an anode (referred to as a failure node $N_{SHORT}$) of the light emitting unit 202_1 on the highest potential side in the state of FIG. 3A. Specifically, the failure node may occur at an output pin P1 of the lighting circuit 300, wiring of a harness connected thereto, or the like.

The controller 320 turns on the most adjacent high-side switch SW1_2 on a lower potential side than the node $N_{SHORT}$ and turns off the remaining high-side switches SW1_1, SW1_3, and SW1_4.

Accordingly, the drive current $I_{DRV}$ generated by the converter 310 can bypass the failure node $N_{SHORT}$ via the high-side switch SW1_2 and can be continuously supplied to the light emitting units 202_2 to 202_4. That is, since lighting states of the light emitting units 202_2 to 202_4 can be maintained, function loss can be reduced.

In order to protect the light emitting units 202 from an overvoltage, a clamp diode (i.e., a Zener diode) 204 functioning as a clamp circuit may be connected in antiparallel to each light emitting unit 202. In FIG. 4A, only the clamp diode 204 for the light emitting unit 202_1 is shown, and clamp diodes 204 of other light emitting units 202 are omitted. The clamp diode 204 may be a current path from the cathode to the anode of the light emitting unit 202 at the time of a short circuit failure. The diode D1 is provided to allow to prevent the drive current $I_{DRV}$ flowing through the high-side switch SW 1_2 from flowing to the failure node $N_{SHORT}$ via the clamp diode 204. Accordingly, the lighting of the light emitting units 202_2 to 202_4 can be maintained in this sate, and an overcurrent can be prevented from flowing through the clamp diode 204.

Even when the clamp diode 204 is not provided, various failure modes can be avoided by providing the diodes D1 to D3. For example, in a case where the cathode of the light emitting unit 202_1 is shorted to ground when the high-side switch SW1_2 is turned on, since the effect of the ground fault is eliminated due to the provision of the diode D1, the light emitting units 202_2 to 202_4 can be turned on.

In FIG. 4B, a short circuit such as a ground fault or a power fault occurs at an anode (shown by the failure node $N_{SHORT}$) of the second light emitting unit 202_2.

The controller 320 turns on the most adjacent high-side switch SW 1_3 on a lower potential side than the node $N_{SHORT}$ where the failure is detected. The remaining high-side switches SW1_1, SW1_2, and SW1_4 are in OFF states.

Accordingly, the drive current $I_{DRV}$ generated by the converter 310 can bypass the failure node $N_{SHORT}$ via the high-side switch SW1_3 and can be continuously supplied to the light emitting units 202_3 and 202_4. That is, since lighting states of the light emitting units 202_2 to 202_4 can be maintained, function loss can be reduced.

When the failure occurs at an anode of the light emitting unit 202_3, similarly, the high-side switch SW1_4 is turned on and the remaining high-side switches SW1_1 to SW1_3 are turned off. Accordingly, the lighting of the light emitting unit 202_4 can be maintained.

Figure 5:
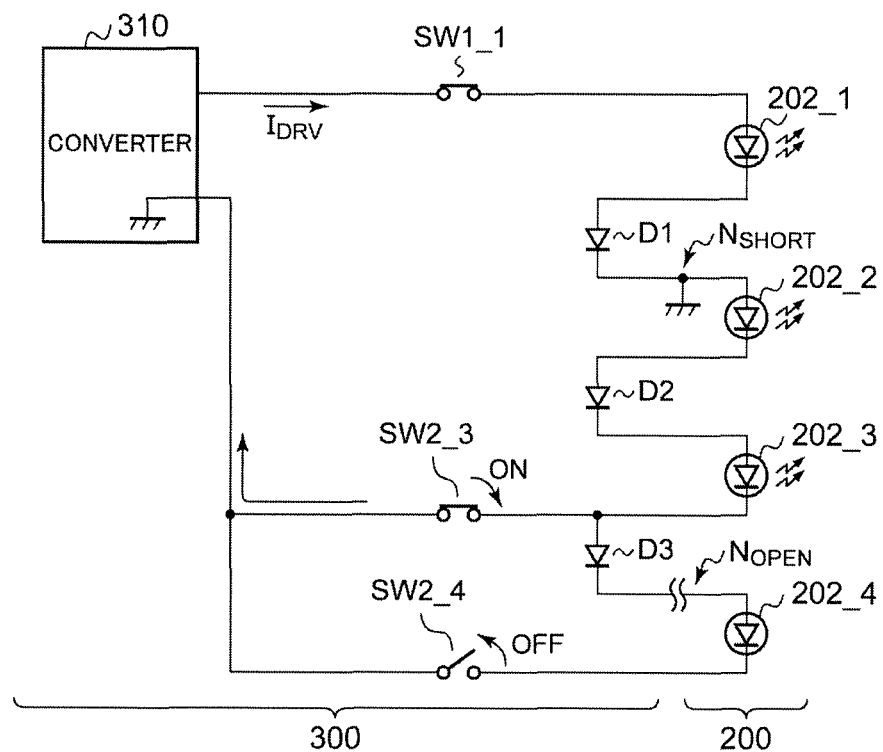
FIG. 5 is an equivalent circuit diagram of the lighting circuit in a failure state.

Here, an example has been described in which the light emitting units 202 on a lower potential side than the failure part are protected, but it is not limited thereto. When the failure part occurs in the light emitting units 202 near the low potential, the light emitting units 202 on a higher potential side than the failed light emitting units 202 may be protected. FIG. 5 is an equivalent circuit diagram of the lighting circuit 300 in a failure state. In FIG. 5, an open circuit failure occurs at an anode of the fourth light emitting unit 202_4. In this case, the most adjacent low-side switch SW 2_3 on a higher potential side to the failure point is turned on, and the remaining low-side switches are turned off.

It is generalized that when the light emitting unit 202_k whose failure is detected is included in lighting target range, that is, when i≤k≤j, the controller 320 changes i or j such that the light emitting unit 202_k is out of the lighting target range. When i is changed, the high-side switch SW1_i corresponding to the changed i is turned on, and when j is changed, the low-side switch SW2_j corresponding to the changed j is turned on.

The above is the operation of the lighting circuit 300. According to the lighting circuit 300, ON/OFF of the plurality of light emitting units 202 can be controlled by controlling the states of the high-side switches SW1 and the low-side switches SW2. Further, at the time of failure, the failure part can be separated, and the remaining light emitting units can be protected to maintain the lighting.

(Applications)

The lighting device 100 described above may be a vehicle lamp. In this case, one of the plurality of light emitting units 202 may be a low beam, and another one may be a high beam. Another one may be a Daytime Running Lamp (DRL), and another one may be a DRL/clearance lamp.

In consideration of protection method at the time of failure, a lamp having a relatively high degree of importance may be assigned to the lower potential side, and a lamp having a low degree of importance may be assigned to the higher potential side. For example, the high and low beams may be regarded as being more important than the DRL and the DRL/clearance. Therefore, for example, as N=4, the plurality of light emitting units 202 may be assigned in order of the DRL, the DRL/clearance lamps, the high beam, and the low beam from the high potential side.

Although the present invention has been described with reference to specific embodiments, the embodiments merely illustrate the principle and application of the present invention, and various modifications and changes in configurations may be made in the embodiments without departing from the spirit of the present invention as defined in the claims.

(First Modification)

Figure 6:
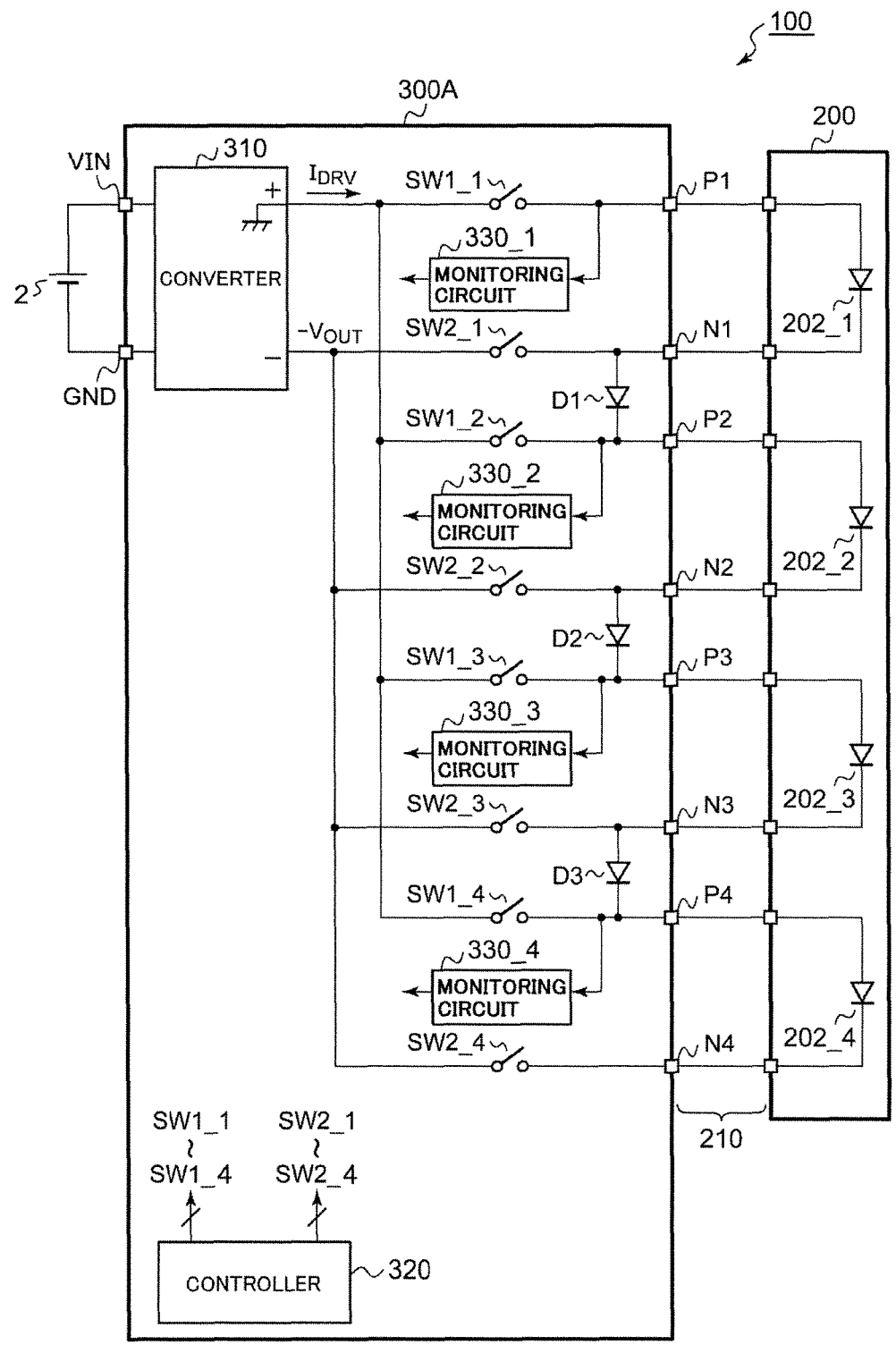
FIG. 6 is a circuit diagram of a lighting circuit according to a first modification.

FIG. 6 is a circuit diagram of a lighting circuit 300A according to a first modification. The converter 310 outputs a negative voltage, and for example, a Cuk converter may be adopted. In this case, the positive electrode output (+) of the converter 310 is grounded, and a negative output voltage $-V_{OUT}$ is generated at the negative electrode output (−).

(Second Modification)

When the lighting device 100 is used as a vehicle lamp, a plurality of light emitting units 202 may be used as a variable light distribution head lamp (i.e., ADB: Adaptive Driving Beam). The ADB dynamically and adaptively controls a light distribution pattern according to the situation in front of the vehicle (e.g., presence or absence of an oncoming vehicle, a preceding vehicles, or pedestrians).

(Third Modification)

Although it is explained that the high-side switches can also be used as a bypass switches for the light emitting units on the higher potential side in the embodiment. The high-side switches, bypass switches may be provided in parallel with the light emitting units to control PWM dimming or individual turning ON/OFF states.

When the lighting device 100 is used as a vehicle lamp, a plurality of light emitting units 202 may be used as a variable light distribution head lamp (i.e., ADB: Adaptive Driving Beam). The ADB dynamically and adaptively controls a light distribution pattern according to the situation in front of the vehicle (e.g., presence or absence of an oncoming vehicle, a preceding vehicles, or pedestrians).

In this case, the light source 200 of FIG. 2 may be a light source for high beam. The vehicle lamp may include an optical system which projects light emitted from the plurality of light emitting units 202 to different regions on a virtual vertical screen in front of the vehicle. By controlling the ON and OFF of the light emitting units 202, the brightness of corresponding regions can be changed, and a desired light distribution pattern can be formed.

The invention claimed is:

1. A lighting circuit configured to drive a light source including a plurality of light emitting units connected in series, the lighting circuit comprising:
    a converter which is configured to supply a drive current to the light source;
    a plurality of high-side switches, each of which is provided between one end of a corresponding light emitting unit and one output of the converter; and
    a plurality of low-side switches, each of which is provided between another end of the corresponding light emitting unit and another output of the converter.

2. The lighting circuit according to claim 1, further comprising:
    a diode which is provided between respective adjacent light emitting units.

3. The lighting circuit according to claim 1, further comprising:
    a plurality of monitoring circuits, each of which is configured to monitor an electrical state of one end of a corresponding light emitting unit.

4. The lighting circuit according to claim 1,
    wherein the another output of the converter is grounded, and
    wherein each low-side switch is provided between the another end of the corresponding light emitting unit and the ground.

5. A vehicle lamp comprising:
    a light source which includes a plurality of light emitting units connected in series; and
    the lighting circuit according to claim 1 which is configured to drive the light source.

* * * * *